UNITED STATES PATENT OFFICE.

RILEY ROOT, OF GALESBURG, ILLINOIS.

IMPROVEMENT IN PROCESSES OF CLARIFYING SACCHARINE JUICES.

Specification forming part of Letters Patent No. 33,450, dated October 8, 1861.

*To all whom it may concern:*

Be it known that I, RILEY ROOT, of the city of Galesburg, county of Knox, and State of Illinois, have invented a new and useful Improvement in Clarifying Cane-Juice; and I do hereby declare that the following is a full and exact description thereof.

I prepare one heater and two coolers of about equal size, varying to suit the amount of business to be done. In a small establishment they may hold one barrel each. The crusher and evaporator should be of corresponding capacity. After having raised the juice in the heater to boiling-point, I take about one spadeful of native clay to a barrel of juice, as free from sand and iron rust as possible, and put it into a common pail or other convenient vessel, and with a large dipper take out a quantity of the heated juice and put into the pail. I stir this violently till I have dissolved as much of the clay as possible, and pour it into the heater. If any of the clay is left undissolved, I repeat the operation till it is all, or nearly all, dissolved, and pour it into the heater. Then with a paddle I agitate the juice violently for a few moments. Soon after it becomes quiet a heavy scum will rise, which must be taken off. A little further agitation may cause an additional scum to rise, which is also taken off. The juice and clay together are then removed to one of the coolers. In a very few minutes the clay will be precipitated to the bottom, together with the green vegetable matter of the juice, leaving the juice clear to be drawn off for evaporation. Two coolers are necessary, so that the juice in one is becoming clear while for the other the juice is being prepared.

Having thus fully described my invention, what I claim as new, and desire to secure by Letters Patent, is—

The use of native clay as an agent for clarifying Chinese and other cane-juice, substantially as specified.

RILEY ROOT.

Witnesses:
 L. H. FULLER,
 CHARLES HAST.